(12) United States Patent
May et al.

(10) Patent No.: US 7,140,019 B2
(45) Date of Patent: Nov. 21, 2006

(54) SCHEDULER OF PROGRAM INSTRUCTIONS FOR STREAMING VECTOR PROCESSOR HAVING INTERCONNECTED FUNCTIONAL UNITS

(75) Inventors: Philip E. May, Palatine, IL (US); Kent Donald Moat, Winfield, IL (US); Raymond B. Essick, IV, Glen Ellyn, IL (US); Silviu Chiricescu, Chicago, IL (US); Brian Geoffrey Lucas, Barrington, IL (US); James M. Norris, Naperville, IL (US); Michael Allen Schuette, Wilmette, IL (US); Ali Saidi, Cambridge, MA (US)

(73) Assignee: Motorola, inc., Schaumburg, IL (US)

( * ) Notice: Subject to any disclaimer, the term of this patent is extended or adjusted under 35 U.S.C. 154(b) by 733 days.

(21) Appl. No.: 10/184,772

(22) Filed: Jun. 28, 2002

(65) Prior Publication Data

US 2004/0003220 A1    Jan. 1, 2004

(51) Int. Cl.
*G06F 9/50* (2006.01)
*G06F 9/44* (2006.01)

(52) U.S. Cl. .................... 718/102; 718/105; 718/104

(58) Field of Classification Search ........ 718/100–108; 715/736
See application file for complete search history.

(56) References Cited

U.S. PATENT DOCUMENTS

| | | | |
|---|---|---|---|
| 3,718,912 A | 2/1973 | Hasbrouck et al. | |
| 4,128,880 A | 12/1978 | Cray, Jr. | |
| 4,744,043 A | 5/1988 | Kloker | |
| 4,760,545 A * | 7/1988 | Inagami et al. | ........... 712/4 |
| 4,807,183 A | 2/1989 | Kung et al. | |
| 4,825,361 A * | 4/1989 | Omoda et al. | ........... 712/6 |
| 4,918,600 A | 4/1990 | Harper et al. | |
| 5,206,822 A | 4/1993 | Taylor | |
| 5,317,734 A * | 5/1994 | Gupta | .......... 717/161 |
| 5,367,494 A * | 11/1994 | Shebanow et al. | ..... 365/230.03 |
| 5,390,352 A | 2/1995 | Kinoshita | |
| 5,418,953 A * | 5/1995 | Hunt et al. | .......... 718/102 |
| 5,423,040 A * | 6/1995 | Epstein et al. | .......... 718/102 |
| 5,450,607 A | 9/1995 | Kowalczyk et al. | |
| 5,495,617 A * | 2/1996 | Yamada | .......... 713/323 |
| 5,652,909 A | 7/1997 | Kodosky | |
| 5,697,788 A | 12/1997 | Ohta | |
| 5,717,947 A | 2/1998 | Gallup et al. | |
| 5,719,998 A | 2/1998 | Ku et al. | |
| 5,734,863 A | 3/1998 | Kodosky et al. | |
| 5,742,821 A * | 4/1998 | Prasanna | .......... 718/102 |

(Continued)

OTHER PUBLICATIONS

Al-Mouhamed, Mayez A. "Lower Bound on the Number of Processors and Time for Scheduling Precedence Graphs with Communication Costs." IEEE. Dec. 1990.*

(Continued)

*Primary Examiner*—Lewis A. Bullock, Jr.

(57) ABSTRACT

A method for scheduling a computation for execution on a computer with a number of interconnected functional units. The computation is representable by a data-flow graph with a number of nodes connected by edge. A loop-period of the computation is calculated and the nodes are scheduled for throughput by assigning an execution cycle and a functional unit to each node of the data-flow graph. The scheduling of flexible nodes is adjusted to minimize the number of interconnections required in each execution cycle. The edges of the data-flow graph are allocated to one or more of the interconnections between functional units. The scheduling method may be used, for example, to optimize the interconnection fabric design for an ASIC or as part of a compiler for a re-configurable streaming vector processor.

24 Claims, 3 Drawing Sheets

U.S. PATENT DOCUMENTS

| | | | |
|---|---|---|---|
| 5,764,787 A | | 6/1998 | Nickerson |
| 5,790,877 A | * | 8/1998 | Nishiyama et al. ......... 713/323 |
| 5,805,614 A | | 9/1998 | Norris |
| 5,821,934 A | | 10/1998 | Kodosky et al. |
| 5,826,080 A | * | 10/1998 | Dworzecki .................. 718/103 |
| 5,881,257 A | | 3/1999 | Glass et al. |
| 5,881,263 A | | 3/1999 | York et al. |
| 5,887,183 A | | 3/1999 | Agarwal et al. |
| 5,893,143 A | * | 4/1999 | Tanaka et al. .............. 711/120 |
| 5,936,953 A | | 8/1999 | Simmons |
| 5,966,528 A | | 10/1999 | Wilkinson et al. |
| 5,969,975 A | | 10/1999 | Glass et al. |
| 5,999,736 A | | 12/1999 | Gupta et al. |
| 6,052,766 A | * | 4/2000 | Betker et al. ............... 711/200 |
| 6,064,819 A | | 5/2000 | Franssen et al. |
| 6,104,962 A | * | 8/2000 | Sastry .......................... 700/86 |
| 6,112,023 A | * | 8/2000 | Dave et al. ................... 703/27 |
| 6,128,775 A | | 10/2000 | Chow et al. |
| 6,173,389 B1 | * | 1/2001 | Pechanek et al. ............. 712/24 |
| 6,192,384 B1 | | 2/2001 | Daily et al. |
| 6,202,130 B1 | | 3/2001 | Scales et al. |
| 6,253,372 B1 | * | 6/2001 | Komatsu et al. ............ 717/149 |
| 6,370,560 B1 | * | 4/2002 | Robertazzi et al. ......... 718/105 |
| 6,381,687 B1 | | 4/2002 | Sandstrom et al. |
| 6,430,671 B1 | | 8/2002 | Smith |
| 6,437,804 B1 | * | 8/2002 | Ibe et al. .................... 715/736 |
| 6,442,701 B1 | * | 8/2002 | Hurd .......................... 713/324 |
| 6,490,612 B1 | * | 12/2002 | Jones et al. ................. 718/107 |
| 6,513,107 B1 | | 1/2003 | Ansari |
| 6,571,016 B1 | * | 5/2003 | Mehrotra et al. ........... 382/236 |
| 6,588,009 B1 | | 7/2003 | Guffens et al. |
| 6,598,221 B1 | | 7/2003 | Pegatoquet et al. |
| 6,629,123 B1 | * | 9/2003 | Hunt .......................... 718/106 |
| 6,647,546 B1 | | 11/2003 | Hinker et al. |
| 6,665,749 B1 | | 12/2003 | Ansari |
| 6,732,354 B1 | | 5/2004 | Ebeling et al. |
| 6,745,160 B1 | | 6/2004 | Ashar et al. |
| 6,792,445 B1 | * | 9/2004 | Jones et al. ................. 718/107 |
| 6,898,691 B1 | * | 5/2005 | Blomgren et al. ............ 712/10 |
| 7,000,232 B1 | * | 2/2006 | Jones et al. ................. 718/102 |
| 7,010,788 B1 | * | 3/2006 | Rehg et al. ................. 718/100 |
| 2002/0080795 A1 | | 6/2002 | Van Wageningen et al. |
| 2002/0112228 A1 | * | 8/2002 | Granston et al. ........... 717/155 |
| 2002/0120923 A1 | * | 8/2002 | Granston et al. ........... 717/160 |
| 2003/0128712 A1 | | 7/2003 | Moriwaki et al. |

OTHER PUBLICATIONS

Samadzadeh, Farideh A. et a. "A Heuristic Multiprocessor Scheduling Algorithm for Creating Near-Optimal Schedules Using Task System Graphs." ACM. 1992.*

Prasanna, G.N. Srinivasa et al. "Generalized Multiprocessor Scheduling for Directed Acylic Graphs." IEEE. 1994.*

Kwok, Yu-Kwong et al. "Static Scheduling Algorithms for Allocating Directed Task Graphs to Multiprocessors." ACM. Dec. 1999.*

Lam, Monica, "Software Pipelining: An Effective Scheduling Technique for VLIW Machines," Procedings of the SIGPLAN '88 Conference on Programming Language Design and Implementation, Atlanta, Georgia, Jun. 22-24, 1988, pp. 318-323.

Lee, Tsing-Fa et al, "A Transformation-Based Method for Loop Folding," IEEE Transactions on Computer-Aided Design of Integrated Circuits and Systems, vol. 13, No. 4, Apr. 1994, pp. 439-450.

Aiken, Alexander, et al., "Resource-Constrained Software Pipelining," IEEE Transactions on Parallel and Distributed Systems, vol. 6, No. 12, Dec. 1995, pp. 1248-1270.

Talla, D.,Architectural techniques to Accelerate Multimedia Applications on General-Purpose Processors, Dissertation, Aug. 2001, pp. 94-125.

Wulf, W.A., Evaluation of the WM Architecture, Association for Comuting Machinery, 1992, pp. 382-390.

Kavi, K.M. et al., A Formal Definition of Data Flow Graph Models, IEEE Transactions on Computers, vol. C-35, No. 11, Nov. 1986, pp. 940-948.

Cooper, K.D. et al., Efficient Computation of Flow Insensitive Interprocedural Summary Information, SIGPLAN Notices, vol. 19, No. 6, Jun. 1984, pp. 247-258.

Strong, H.R., Vector Execution of Flow Graphs, Journal of the Association for Computing Machinery, vol. 39, No. 1, Jan. 1983, pp. 186-196.

* cited by examiner

| CYCLE | DATA | SLICE0 | SLICE1 | SLICE2 | SLICE3 |
|---|---|---|---|---|---|
| 0 | input | v7 | v7 | v15(-1) | v14(-1) |
| 0 | operation | T7(-1) | T7(-1) | | |
| 0 | output | | | v16(-2) | v17(-2) |
| 1 | input | v17(-1) | v16(-1) | v15(-1) | v14(-2) |
| 1 | operation | v7 | v7 | | |
| 1 | output | | | | |
| 2 | input | v14 | v15 | T7 | T7 |
| 2 | operation | v17(-1) | v16(-1) | v15(-1) | v14(-1) |
| 2 | output | | | | |
| 3 | input | v14 | v15 | v7(+1) | v7(+1) |
| 3 | operation | | | T7 | T7 |
| 3 | output | v17(-1) | v16(-1) | | |
| 4 | input | v14 | v15 | v16 | v17 |
| 4 | operation | | | v7(+1) | v7(+1) |
| 4 | output | | | | |
| 5 | input | T7(+1) | T7(+1) | v15(+1) | v14(+1) |
| 5 | operation | v14 | v15 | v16 | v17 |
| 5 | output | | | | |
| 6 | input | v7(+2) | v7(+2) | v15(+1) | v14(+1) |
| 6 | operation | T7(+1) | T7(+1) | | |
| 6 | output | | | v16 | v17 |

*FIG. 3*

SCHEDULER OF PROGRAM INSTRUCTIONS FOR STREAMING VECTOR PROCESSOR HAVING INTERCONNECTED FUNCTIONAL UNITS

CROSS REFERENCE TO RELATED APPLICATIONS

This application is related to patent applications, application Ser. No. 10/184,609 filed Jun. 28, 2002 titled "INTERCONNECTION DEVICE WITH INTEGRATED STORAGE" now issued as U.S. Pat. No. 6,850,536 dated Jan. 12, 2005 and identified by, application Ser. No. 10/184,582 filed Jun. 28, 2002 titled "MEMORY INTERFACE WITH FRACTIONAL ADDRESSING" now issued as U.S. Pat. No. 6,799,261 dated Sep. 9, 2004 and identified by, application Ser. No. 10/184,583 filed Jun. 28, 2002 titled "RE-CONFIGURABLE STREAMING VECTOR PROCESSOR" and identified by, application Ser. No. 10/184,743 filed Jun. 28, 2002 titled "METHOD OF PROGRAMMING LINEAR GRAPHS FOR STREAMING VECTOR COMPUTATION" now issued as U.S. Pat. No. 6,934,938 dated Aug. 23, 2005 and identified by, which are filed on even day herewith and are hereby incorporated herein by reference.

FIELD OF THE INVENTION

This invention relates generally to the field of computer program schedulers. More particularly, this invention relates to a method and apparatus for efficient scheduling of program instructions for a streaming vector processor.

BACKGROUND OF THE INVENTION

A computer compiler is used to produce object code from a source code program. An instruction scheduler is a portion of a computer compiler that is used to establish the order in which at least some of the instructions will be executed. Most computers use named storage, such as registers, to store intermediate values. Part of the job of the scheduler is the allocation of the named storage. Another part of the job of the scheduler is to rearrange the order of program instructions to make efficient use of available hardware resources.

In vector processing, it is common for a set of operations to be repeated for each element of a vector or other data structure. This set of operations is often described by a data-flow graph. For example, a data-flow graph may be used to describe all of the operations to be performed on elements of the data structure for a single iteration of a program loop. It may be necessary to execute these operations number of times during the processing of an entire stream of data (as in audio or video processing for example). Considerable effort has been applied to the efficient scheduling of program loops. Software pipelining is an approach in which the execution of one iteration of a loop is started before the previous iteration has been completed. I.e. the computation of the iterations is overlapped. This may be facilitated, for example, by moving the entry point of a loop. If the entry point is moved, one or more iterations of one or more instructions of the loop are moved outside of the main loop. This generates a prolog (instructions before the main loop) or epilog (instructions after the main loop).

In another loop optimization method, redundant speculative computations in the compilation of an inner loop are eliminated. A number of loop transformations (based on the loop inductive variable) are used in order to eliminate the redundant computations.

List scheduling is a simple way to reorder instructions with a basic block. Instructions are sorted according to priority order (e.g. instructions with the longest period first, or instructions on the critical path first). Next, every instruction is checked with respect to its data dependencies. If all predecessors are already scheduled, the candidate instruction is assigned to a cycle. Resource conflicts are then taken into account and an offset is computed to delay issue of the instructions until all required functional units are guaranteed to be free when needed. This process is iterated until all instructions are scheduled.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION OF THE INVENTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The present invention relates to a scheduler for efficient scheduling of program instructions for a streaming vector processor. The scheduler is designed to maximize throughput in a streaming vector processor with consideration for limited interconnection between functional units (processing units) and unnamed storage between units. The scheduler manages routing and storage of intermediate results to achieve pipelined schedules.

One of the uses of the present scheduler is to reduce the size of the interconnect structure. This presents the scheduler with several choices: (a) use specific named storage to hold intermediate values, (b) route them through trampoline nodes (which can be otherwise idle functional units) until the consumer node can accept them or (c) use unnamed link-based storage. In the preferred embodiment, the use of specific named storage is avoided because it constrains the achievable throughput and breaks any clean data flow. Using the trampoline nodes helps maintain the stream-like flow of data through the computation, improving overall throughput and efficiency.

The source code may be provided in the form of a data-flow graph (DFG) representation, as described in co-pending application 'Method of Programming Linear Graphs for Streaming Vector Processing'. This representation is particularly useful for programming a vector processor of the type described in co-pending application titled 'Re-configurable Streaming Vector Processor' and referred to as an 'RSVP'. Prior scheduling techniques may not be used for loop optimization, since the RSVP architecture and the DFG programming model prohibit the movement of loop entry points. Further, loops may not be optimized by eliminating loop inductive variables, since loop inductive variables are not available in the RSVP architecture and the DFG programming model and no speculative instructions are performed.

Figure 1:
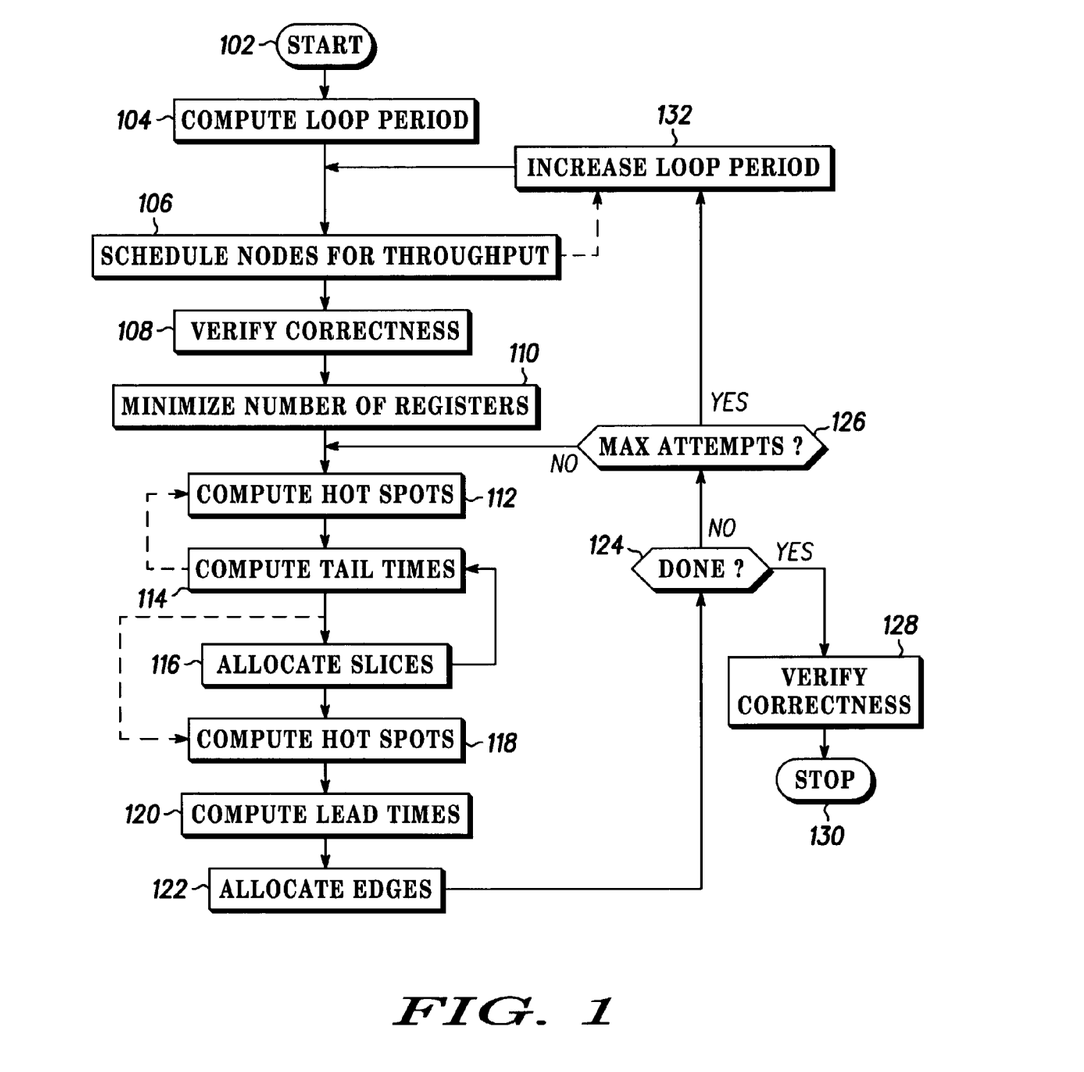
FIG. 1 is a flow chart of one embodiment of the scheduling method of the present invention.

A flow chart of one embodiment of the method of the present invention is shown in FIG. 1. Referring to FIG. 1, following start block 102, the loop-period is calculated at block 104 based on the number and types of processing resources available and the structure of the data-flow graph (DFG). The loop-period represents the number of cycles between the start of successive iteration. Smaller loop-periods indicate higher throughput. Routing resources are not taken into consideration in this phase. The computed loop-period represents the optimal minimum period that can be achieved. For example, if a path in the data-flow graph requires 10 multiplication operations and only two multipliers are available, the minimum loop period is five cycles.

At block 106 the DFG nodes are scheduled starting with the loop-period that was computed in at block 104. The primary objective of the scheduler is to maximize throughput and the secondary one is to minimize latency. During the process, the loop-period might be increased in order to accommodate resource constraints, order dependencies and iteration dependencies. The result of this step is a list of nodes that are bound to appropriate resources and are assigned specific firing cycles and partitions (iterations). The scheduler splits the input DFG into a number of partitions that are executed in parallel. The number of partitions represents the number of iterations that are executed in parallel once a steady state has been achieved. These iterations may begin in different cycles. The data and order dependencies are checked at each step, however, an additional verification of the correctness of the node list may be made at block 108.

The connections between functional units in an RSVP are not hard-wired, so once a valid schedule has been produced (so far, the connections between functional units inferred by the scheduler are virtual), the scheduler has to allocate the existing links to connect the producer and consumer functional units. These links are allocated on a cycle-by-cycle basis subject to a maximum number of simultaneous links per cycle. For some degenerate graphs, registers need to be allocated in order to store intermediate results. At block 110 the scheduler moves the flexible nodes (nodes that have scheduling slack) so as to minimize the number of simultaneous links that need to be made in a cycle. This process helps to reduce the number of links required and the number of registers required for storing intermediate results. Nodes are moved between their ASAP (as soon as possible) and ALAP (as late as possible) time slots in order to minimize the number of registers required in any cycle. This step is motivated by a "zero registers" goal.

At block 112 the cycles in which the number of links required to route the information from producers to consumers is greater than the number of available links is determined. These cycles are referred to as "hot spots". Block 112 produces a list of nodes in an order that minimizes the contention for links.

At block 114, the tail-times of the graph's nodes (in the order in which they are passed) are computed. The tail-time is the number of cycles for which an output result is held before being used by another functional unit. The order in which the tail-times are computed has a large influence on the quality of the resulting schedule. The best order of computing the tail-times of the nodes is derived in block 112.

If more than one node is mapped onto a function unit resource at a given clock cycle, then the nodes have to be allocated to slices. At block 116 any node that is mapped onto a partitioned resource is assigned to one or more fixed slices within the resources. Since this is a complex problem, an approximation to the optimal solution is found that affects the tail-times of a limited number of nodes only. Allocation of slices in partitioned functional units may result in the formation of an irregular scheduling. In the RSVP vector processor, invalid data is indicated by a special bit pattern called a "slug". In contrast with traditional software pipelining techniques, the schedule may be dependent upon the iteration number. In order to assure a correct execution of such a schedule slugs may be used to discard unnecessary results.

The allocation of slices within the functional units may affect the number of links required in a cycle. At block 118 the cycles in which the number of links required to route the information from producers to consumers is greater than the number of available links is determined again.

At block 120, the lead-times of the graph's nodes (in the order in which they are passed) are computed. The lead-time is the number of cycles for which a data value is stored at the functional unit input before being used by it.

In this embodiment, the tail-time and lead-time calculations are performed sequentially since these two problems are not independent in the RSVP. However, for some hardware platforms the two problems are independent.

At block 122 the scheduler assigns edge storage to either a producer functional unit, a consumer functional unit, or both. The stage allocates the links between the scheduled nodes. The scheduler exploits a capability of the functional units, which is that functional units maintain their results until overwritten. In addition, the input operands can be placed in input latches anytime before the functional unit fires. This contrasts with other data-flow designs in which the functional unit fires as soon as the input operands have all arrived. The RSVP has a switch-based, incomplete interconnection network rather than a completely interconnected shared-bus network. This adds complexity to the scheduler, which must now schedule both the use of the interconnection network as well as the use of functional units. The scheduler takes account of limited interconnection between Function Units (FU), but the scheduler may also be used when the functional units are fully interconnected. Trampoline nodes or linked-based storage may be inserted when direct connections are not possible (as opposed to using special or named registers; this option would also break the flow of the graph).

The exact cycle when the intermediate result is handed from the producer functional unit to the consumer functional unit determines the interconnection firing. The edges are scheduled based on a force-directed approach that tries to schedule the read and write operations in a way that minimizes the number of required links per cycle. Merges (one push followed by multiple pops, i.e. one link routes same value to different places at different times) are also performed where this is applicable (i.e. edges that share the same source node). Trampoline nodes might also be inserted in order to forward information from one node to another. The edges of the input DFG may be time-multiplexed onto the limited physical resources of the interconnect network.

The critical path is subject to pseudo-dynamic control, so that when a trampoline node is inserted the critical path is recalculated because the addition might change it. Certain types of nodes might also be duplicated in order to minimize the number of registers required in any given cycle. Intermediate results may be stored at the input or output of a functional unit. The functional unit fires independently of the input arrivals (in contrast to the Transport Triggered Architecture where the FU fires whenever a move that has the "trigger" input involved is being initiated). The Functional Unit (FU) characteristics make for a very large search space. Intermediate results are preferably stored at the inputs/outputs of the functional units onto which the graph's nodes have been mapped. If this is not possible, the results are stored at the inputs/outputs of free FU. If there are not enough free FUs, the results are stored in registers. By using the above-mentioned storing order the number of interconnections is minimized, thereby minimizing the amount of interconnection fabric required (since there are fewer ports to be supported).

Since the scheduler minimizes the interconnections required, it may be used in the design of application specific integrated circuits (ASIC). An integrated circuit that is to be used for a specific computation is designed so that the hardware is optimized for that computation. The hardware includes a set of functional units and the interconnection fabric to interconnect the functional units. The computation may be scheduled for a number of different functional unit configurations. For each configuration, the minimum interconnection fabric is determined by scheduling the computation using the scheduler of the present invention. In this manner, the amount of interconnection fabric is minimized, thereby minimizing the cost and complexity of the ASIC.

At decision block 124 a check is made to determine if the scheduling process has been completed. If not, as indicated by the negative branch from decision block 124, flow continues to decision block 126. If the process is completed, as indicated by the positive branch from decision block 124, the correctness is optionally verified again at block 128 and the process terminates at block 130.

At decision block 126, a check is made to determine if all of the lead-time and tail-time of a node is required during the edge allocation phase. If less than the maximum time is required, as indicated by the negative branch from decision block 126, another round of trials is started from block 112. If all of the lead-time and tail-time of a node is required during the edge allocation phase, as indicated by the positive branch from decision block 126, the loop-period is increased by one at block 132. This allows more flexibility in the register minimization process (longer ASAP-ALAP intervals) and allows migrations between partitions.

The output from the scheduler is typically a list of microcode instructions or VLIW (very long instruction word) instructions. These instructions specify the operation of the functional units and the interconnections between functional units and link-based or register storage.

The scheduler produces schedules that are optimized primarily for throughput and secondarily for latency. A trade-off between these two goals can be achieved by specifying the current loop latency preference. Such a feature is useful when the DFG is executed only a small number of times. There is a break-even point beyond which a schedule that is optimized for throughput makes more sense than one that is optimized for latency. Having two schedules and allowing the system to load one of them based on the iteration count, which is determined at run-time, can improve the performance of the system. However, this is at the expense of an increase in memory required for storing both schedules. Two or more schedules may be combined or compressed in order to reduce storage space.

In prior software pipelining techniques, the goal is to minimize the initiation interval (at the possible expense of increasing either or both of a loop prolog, or loop epilog). These epilogs may be removed if predicated execution is supported or if additional hardware is added. The Re-configurable Streaming Vector Processor (RSVP) of co-pending application titled "Re-configurable Streaming Vector Processor", application Ser. No. 10/184,583 filed Jun. 28, 2002 provides a different mechanism for handling pipelining. This avoids the need for extra code to deal with scenarios that often generate epilogs in prior approaches. For example, in prior techniques, unrolling loops to run two iterations concurrently requires a check for an odd number of iterations to be included as part of an epilog. This is not required in the scheduler of the present invention.

In prior software pipelining, all the iterations are scheduled in the same way (i.e., a node is scheduled onto the same resource, in the same slice irrespective of the iteration count). In the scheduler of the present invention, iterations can be scheduled differently. For example, alternate iterations may use different resources instances or different slices of the same resource.

Sometimes the scheduling of adjacent iterations can be packed closer together if the two use different resource instances, even though they may have the same functional unit orderings. In particular, throughput is improved if the choice of functional unit instance alternates between different iterations. This gives rise to a resource map for adjacent iterations that has a slightly different shape (in contrast to the software pipeline techniques where each iteration has exactly the same shape and unit instance allocations), and can be more tightly packed, resulting in a higher throughput.

An example RSVP routine for performing a quantization operation is

|    | vbegin 7f-1f, 0 |        |
|----|-----------------|--------|
| 1: | vld.s16         | v1     |
| 2: | vsign.s16       | 1b     |
| 3: | vmul.s16        | 2b, s2 |
| 4: | vsub.s16        | 1b, 3b |
| 5: | vmul.s32        | 4b, s1 |
| 6: | vasru.s16       | 5b, 16 |
| 7: | vst.s16         | 6b, v0 |
|    | vend            |        |

TABLE 1 shows how three iterations of the quantization loop can be scheduled. The asterisks denote invalid data, which may be indicated by one of more bits in the data representation. The prefixed letters denote the iteration so, for example, b3 is the third node of iteration b. In this example up to three iterations are being processed at one time (in cycle 6 for example). The data-flow graph has been separated into three partitions. No epilog or prolog code is required. The process is pipelined so that a new result is obtained every 3 cycles, whereas a single iteration requires 7 cycles.

TABLE 1

| Cycle | V1 | Logic | Mult | Adder | V0 |
|-------|----|-------|------|-------|----|
| 0     | a1 |       |      | *     | *  |
| 1     |    | a2    | *    |       |    |
| 2     |    | *     | a3   |       |    |
| 3     | b1 |       |      | a4    | *  |

TABLE 1-continued

| Cycle | V1 | Logic | Mult | Adder | V0 |
|---|---|---|---|---|---|
| 4 | | b2 | a5 | | |
| 5 | | a6 | b3 | | |
| 6 | c1 | | | b4 | a7 |
| 7 | | c2 | b5 | | |
| 8 | | b6 | c3 | | |
| 9 | * | | | c4 | b7 |
| 10 | | * | c5 | | |
| 11 | | c6 | * | | |
| 12 | * | | | * | c7 |
| 13 | | * | * | | |
| 14 | | * | * | | |

If storage is available for intermediate results, the schedule can be made more efficient, as shown in TABLE 2. In TABLE 2, Store0 and Store1 denote storage of some kind. Now as many as five iterations are processed concurrently (as in cycles 8 and 9). Hence there are five partitions in this schedule. Two new results are produced every four cycles, so the addition of storage has improved throughput.

If the Adder can be configured as a trampoline node, it may be used as Store1.

TABLE 2

| Cycle | V1 | Logic | Mult | Adder | Store0 | Store1 | V0 |
|---|---|---|---|---|---|---|---|
| 0 | a1 | * | * | | | * | * |
| 1 | b1 | a2 | * | * | | | * |
| 2 | | b2 | * | * | a | | |
| 3 | | * | * | | b | a | |
| 4 | c1 | * | a3 | | | b | * |
| 5 | d1 | c2 | b3 | a4 | | | * |
| 6 | | d2 | a5 | b4 | c | | |
| 7 | | a6 | b5 | | d | c | |
| 8 | e1 | b6 | c3 | | d | | a7 |
| 9 | f1 | e2 | d3 | c4 | | | b7 |
| 10 | | f2 | c5 | d4 | e | | |
| 11 | | c6 | d5 | | f | e | |
| 12 | * | d6 | e3 | | | f | c7 |
| 13 | * | * | f3 | e4 | | | d7 |
| 14 | | * | e5 | f4 | * | | |
| 15 | | e6 | f5 | | * | * | |
| 16 | * | f6 | * | | | * | e7 |
| 17 | * | * | * | * | | | f7 |
| 18 | | * | * | * | * | | |
| 19 | | * | * | | * | * | |

Notice that all iterations are scheduled in the same way, using the same resources. This is not always the case.

Figure 2:
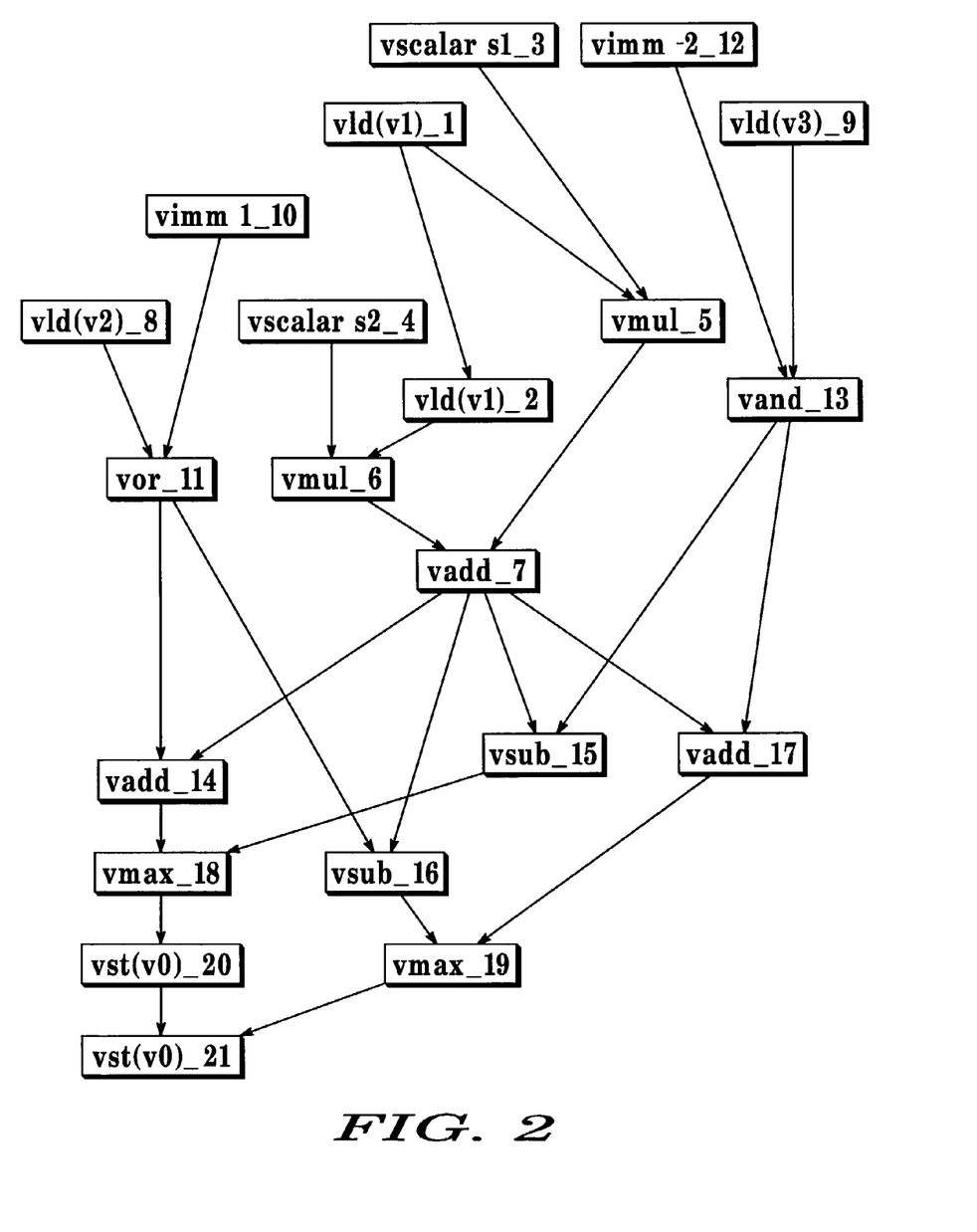
FIG. 2 is a data-flow graph of an exemplary computation.

A data graph for a further exemplary computation is shown in FIG. 2. This example is extracted from a graph for a Viterbi algorithm. In the data-graph in FIG. 2, each node is labeled by the operation to be performed. The appended numbers denote the node number (instead of using a register). The connections between the nodes are referred to as edges and indicate data flow from one node to the next. The timing of the node operations and the passing of data from one node to the next is considered by the scheduler.

Figure 3:
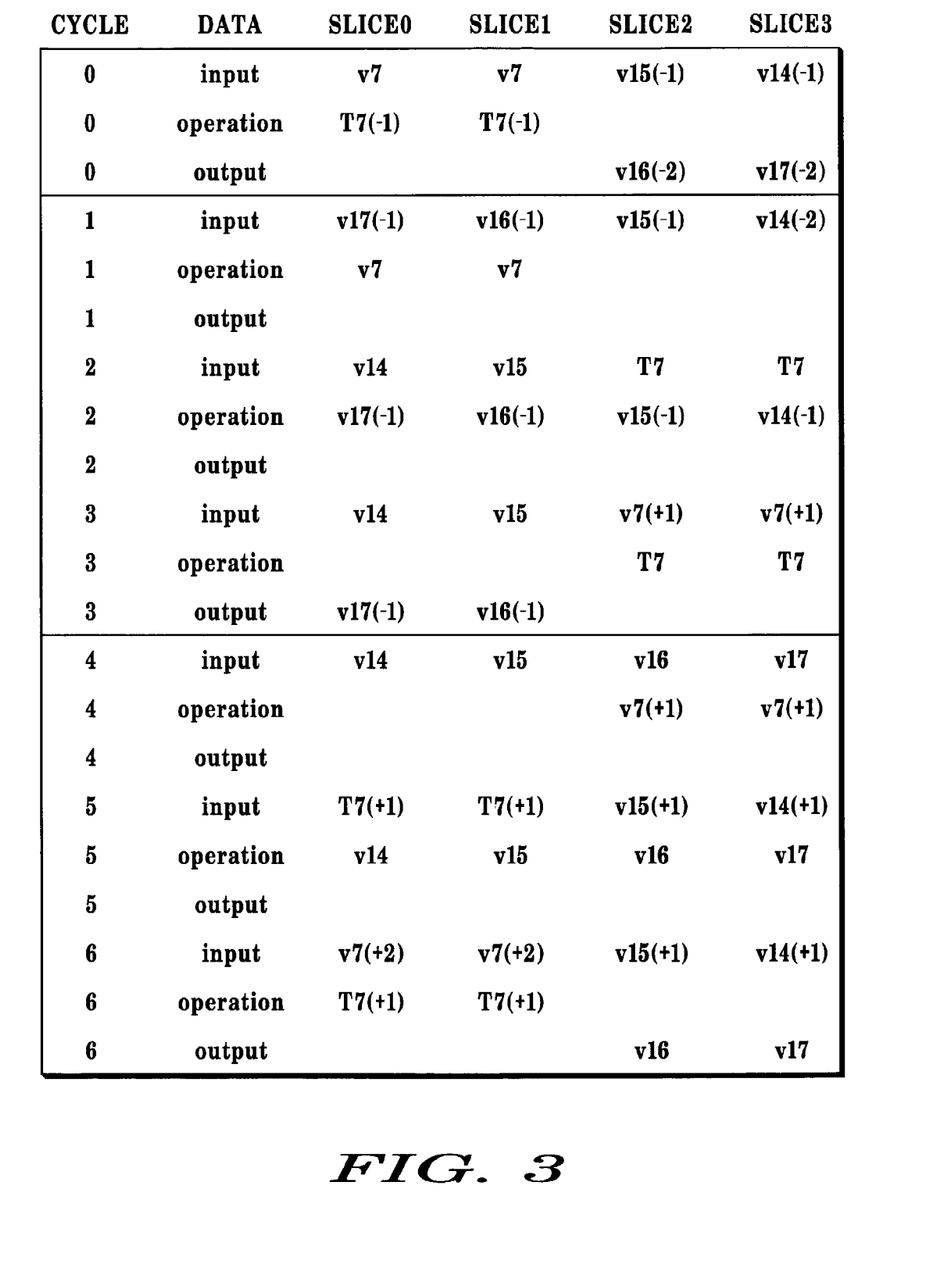
FIG. 3 is a schedule for an adder in an exemplary schedule for the computation illustrated in FIG. 2.

FIG. 3 shows an example schedule for the part of the data-flow graph assigned to an adder. In this example, the adder is partitioned in four slices. The adder can add or subtract data values from a pair of input slices or act as a trampoline node, copying the data from an input slice to an output slice. Each slice of the adder is scheduled. In this example the adder can store data values at its inputs and outputs, so the movement of data is scheduled for each cycle, in addition to the operation being performed in the cycle.

Three iterations are overlapped in this example. In FIG. 3 the numbers in brackets denote the iteration number relative to the current iteration. Referring to FIG. 3, in cycle 0 the data to be used by node 7 in the current iteration are stored at the input to the adder in slices 0 and 1. At the same time, some of the data values to be used by nodes 14 and 15 in the previous iteration are stored at the inputs of slices 3 and 2 respectively. Also in cycle 0, slices 0 and 1 of the adder are operated as a trampoline node for result from node 7 of the previous iteration. Still further in cycle 0, the results from nodes 16 and 17 from two cycles previously are still present at the outputs of slices 2 and 3. In cycle 1, the input values required by nodes 17 and 16 of the previous iteration are stored at the inputs of slices 0 and 1 respectively. The inputs of slices 2 and 3 are left unchanged. Also in cycle 1 the addition of node 7 is performed. In cycle 2 the operations of nodes 14, 15, 16 and 17 from the previous cycle are performed and the input data for nodes 14 and 15 of the current cycle are moved to the inputs of slices 0 and 1. The output from node 7 (calculated in the previous cycle) is stored at the input of slices 2 and 3. The computation proceeds as indicated in FIG. 3. In cycle 5 the final functional operations of the current iteration are performed. The same functional operations are performed in cycles 4, 5 and 6 as were performed in cycles 1, 2 and 3. However, the slice allocation is different. The slice allocation depends on whether the iteration is an odd iteration or an even iteration. FIG. 3 also illustrates the lead and tail-times for the nodes. For example, node 14 of the current iteration fires in cycle 5, and the data is present at the input in cycles 2, 3 and 4. The lead-time is therefore 3 cycles. Similarly, node 16 is fired in cycle 5 and has a lead-time of 1 (the input is present in cycle 4) and a tail-time of 1 (the output is present in cycle 6). After 6 cycles the schedule repeats for the next pair of iterations, so cycle 6 is the same as cycle 0, except that the iteration number has been increased by two. It is to be noted that, in general, inputs to a functional unit can arrive in different cycles or several cycles before the operation is performed. This is in contrast to previous data flow-machines, in which the arrival of an input value triggers the operation of functional unit.

The present invention, as described in embodiments herein, is implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for scheduling a computation for execution on a computer comprising a plurality of functional units interconnected by a plurality of interconnections, the computation being representable by a data-flow graph having a plurality of nodes and a plurality of edges and the method comprising:
   (a) computing a loop-period of the computation;
   (b) attempting to schedule the plurality of nodes within the loop period for throughput by assigning an execution cycle and a functional unit to each node of the plurality of nodes;
   (c) adjusting the scheduling of flexible nodes of the plurality of nodes to reduce the number of interconnections required in any execution cycle if the number of interconnections required exceeds the number of interconnections in the plurality of interconnections; and
   (d) allocating the plurality of edges to one or more of the plurality of interconnections.

2. A method in accordance with claim 1, wherein one or more of the functional units is partitioned into two or more slices, the method further comprising:
   mapping nodes of the data-flow graph onto slices of the one of more of the partitioned functional units so as to reduce the number of interconnections required in an execution cycle.

3. A method in accordance with claim 2, and wherein the mapping nodes of the data-flow graph onto slices of the one of more of the partitioned functional units so as to reduce the number of interconnections required in an execution cycle comprises:
   computing a set of execution cycles number for which the number of interconnections required is greater than the number of interconnections in the plurality of interconnections;
   computing tail-times for each node that is the source of an edge that intersects the set of execution cycles; and
   mapping nodes onto slices of the one of more of the partitioned functional units so as to reduce the number of interconnections required in a cycle.

4. A method in accordance with claim 2, further comprising:
   computing the set of execution cycles for which the number of interconnections required is greater than the number of interconnections in the plurality of interconnections;
   computing lead-times for each node that is the destination of an edge that intersects the set of execution cycles allocated to a cycle of the first set of execution cycles; and
   mapping nodes onto the slices of the one of more of the partitioned functional units so as to reduce the number of interconnections required in a cycle.

5. A method in accordance with claim 2, wherein slugs are used to discard results from unused slices of the one of more of the partitioned functional units.

6. A method in accordance with claim 1, wherein the edges of the plurality of edges are allocated so that values are stored at one or more of:
   an input of a functional unit;
   an output of a functional unit;
   a storage entry in the interconnection fabric; and
   a trampoline node.

7. A method in accordance with claim 1, wherein the plurality of interconnections comprises a re-configurable interconnect fabric having a plurality of links and wherein the edges of the plurality of edges are allocated so that values live at one or more of:
   an output of a functional unit;
   a storage entry in the interconnection fabric;
   a trampoline node; and
   an input of a functional unit.

8. A method in accordance with claim 1, wherein the scheduling the plurality of nodes for throughput by assigning an execution cycle and a functional unit to each node of the plurality of nodes comprises:
   (b1) attempting to schedule the plurality of node within the loop-period; and
   (b2) while the attempt to schedule the plurality of node within the loop-period is unsuccessful, increasing the loop-period and repeating from (b1).

9. A method in accordance with claim 1, wherein the allocating the plurality of edges to one or more of the plurality of interconnections comprises
   (d1) attempting to allocate the plurality of edges to one or more of the plurality of interconnections; and
   (d2) if the attempt to allocate the plurality of edges is unsuccessful, increasing the loop-period and repeating from (d1).

10. A method in accordance with claim 1, wherein the plurality of interconnections comprises a re-configurable interconnect fabric having a plurality of links and wherein the allocation of an edge of the plurality of edges is ordered as:
    the input or output of the functional unit to which the node is assigned;
    a storage entry in the interconnection fabric; and
    the input or output of a free functional unit.

11. A method in accordance with claim 1, further comprising splitting the data-flow graph into a number of partitions, corresponding to the number of iterations that are executed in parallel when a steady state operation of the computer has been achieved.

12. A method in accordance with claim 1, further comprising overlapping the schedules for two or more adjacent iterations to obtain a higher throughput.

13. A method in accordance with claim 1, wherein consecutive iterations are scheduled to use different functional unit instances.

14. A method in accordance with claim 1, wherein two schedules are computed, one for maximum throughput and one for minimum latency, and wherein a schedule of the two schedules is selected in accordance with the number of iterations to be performed.

15. A method in accordance with claim 1, wherein the resulting schedule is represented as one of a set of very long instruction words and microcode instructions.

16. A method for minimizing the number of interconnections required by a computer to execute a computation, the computer comprising a plurality of functional units interconnected by a plurality of interconnections, the computation being representable by a data-flow graph having a plurality of nodes and a plurality of edges and the method comprising:
    (a) computing a loop-period of the computation;
    (b) attempting to schedule the plurality of nodes within the loop period by assigning an execution cycle and a functional unit to each node of the plurality of nodes;
    (c) adjusting the scheduling the plurality of nodes to minimize the number of interconnections required in any execution cycle;

(d) adjusting the scheduling of the plurality of nodes to increase throughput if the throughput is below a predetermined minimum throughput;

(e) adjusting the scheduling of the plurality of nodes to decrease latency if the latency exceeds a predetermined maximum latency; and (f) allocating the plurality of edges to one or more of the plurality of interconnections.

17. A computer readable medium containing instructions which, when executed on a first computer, carry out a process of scheduling a computation for execution on a second computer, the second computer having a plurality of functional units interconnected by a plurality of interconnections, and the computation being representable by a data-flow graph having a plurality of nodes and a plurality of edges, the process of scheduling comprising:

(a) computing a loop-period of the computation;

(b) attempting to schedule the plurality of nodes within the loop period for throughput by assigning an execution cycle and a functional unit to each node of the plurality of nodes;

(c) adjusting the scheduling of flexible nodes of the plurality of nodes to reduce the number of interconnections required in each execution cycle if the number of interconnections required is greater than the number of interconnection in the plurality of interconnections; and (d) allocating the plurality of edges to one or more of the plurality of interconnections.

18. A computer readable medium in accordance with claim 17, wherein one or more of the functional units is partitioned into two or more slices, the process further comprising:

assigning slices of the one of more of the partitioned functional units so as to reduce the number of interconnections required in an execution cycle.

19. A computer readable medium in accordance with claim 18, wherein the assigning slices of the one of more of the partitioned functional units so as to reduce the number of interconnections required in an execution cycle comprises:

computing a set of execution cycles number for which the number of interconnections required is greater than the number of interconnections in the plurality of interconnections;

computing tail-times for each node allocated to a cycle of the set of execution cycles; and mapping nodes to slices of the one of more of the partitioned functional units so as to reduce the number of interconnections required in a cycle.

20. A computer readable medium in accordance with claim 18, further comprising:

computing the set of execution cycles for which the number of interconnections required is greater than the number of interconnections in the plurality of interconnections;

computing lead-times for each node that is the destination of an edge that intersects the set of execution cycles allocated to a cycle of the first set of execution cycles; and mapping nodes to the slices of the one of more of the partitioned functional units so as to reduce the number of interconnections required in a cycle.

21. A computer readable medium in accordance with claim 17, wherein the allocating the plurality of edges to one or more of the plurality of interconnections comprises (d1) attempting to allocate the plurality of edges to one or more of the plurality of interconnections; and (d2) if the attempt to allocate the plurality of edges is unsuccessful, increasing the loop-period and repeating from (d1).

22. A computer readable medium in accordance with claim 17 where the first and second computers are the same computer.

23. An application specific integrated circuit for performing a computation representable by a data-flow graph having a plurality of nodes and a plurality of edges, the application specific integrated circuit having a plurality of functional units interconnected by a plurality of interconnections, wherein the number of interconnections in the plurality of interconnections is determined by:

(a) computing a loop-period of the computation;

(b) attempting to schedule the plurality of nodes within the loop period for throughput by assigning an execution cycle and a functional unit to each node of the plurality of nodes;

(c) adjusting the scheduling of flexible nodes of the plurality of nodes to minimizing the number of interconnections required in each execution cycle; and (d) allocating the plurality of edges to one or more of the plurality of interconnections.

24. An application specific integrated circuit in accordance with claim 23, wherein the allocating the plurality of edges to one or more of the plurality of interconnections comprises (d1) attempting to allocate the plurality of edges to one or more of the plurality of interconnections; and (d2) if the attempt to allocate the plurality of edges is unsuccessful, increasing the loop-period and repeating from (d1).

* * * * *